(12) United States Patent
Takemura

(10) Patent No.: US 9,814,091 B2
(45) Date of Patent: Nov. 7, 2017

(54) INFORMATION PROCESSING APPARATUS AND COMPUTER PROGRAM PRODUCT

(71) Applicant: Kazumasa Takemura, Kanagawa (JP)

(72) Inventor: Kazumasa Takemura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/374,184

(22) Filed: Dec. 9, 2016

(65) Prior Publication Data

US 2017/0171910 A1   Jun. 15, 2017

(30) Foreign Application Priority Data

Dec. 11, 2015  (JP) ................. 2015-242378

(51) Int. Cl.
*H04W 76/06* (2009.01)
*H04W 12/10* (2009.01)
*H04L 29/12* (2006.01)

(52) U.S. Cl.
CPC ......... *H04W 76/068* (2013.01); *H04W 12/10* (2013.01); *H04L 61/6081* (2013.01)

(58) Field of Classification Search
CPC ....... H04L 67/16; H04L 67/34; H04L 67/104; H04W 40/246
USPC ..... 455/450, 452.2; 370/236, 252, 254, 401; 709/205, 208, 224
See application file for complete search history.

(56) References Cited

U.S. PATENT DOCUMENTS

| | | |
|---|---|---|
| 2008/0181187 A1 | 7/2008 | Scott et al. |
| 2009/0089865 A1 | 4/2009 | Baron et al. |
| 2009/0323569 A1 | 12/2009 | Wentink |
| 2011/0235624 A1 | 9/2011 | Scott et al. |
| 2011/0238824 A1 | 9/2011 | Scott et al. |
| 2011/0238847 A1 | 9/2011 | Scott et al. |
| 2012/0134310 A1 | 5/2012 | Wentink |

FOREIGN PATENT DOCUMENTS

| | | |
|---|---|---|
| JP | 2004-096495 | 3/2004 |
| WO | WO 2008/061347 A1 | 5/2008 |

OTHER PUBLICATIONS

European search report dated Feb. 20, 2017 in corresponding European Patent Application No. EP16203189.2.

*Primary Examiner* — Sam Bhattacharya
(74) *Attorney, Agent, or Firm* — Cooper & Dunham LLP

(57) ABSTRACT

A first memory stores an application that causes a processor to acquire, via the wireless communication performed by a first interface according to a first communication method, creation information required to create communication information to be used by a second interface performing the wireless communication according to a second wireless communication method; create the communication information containing the acquired creation information and decision information used for deciding whether the communication information is to be deleted; determine whether the wireless communication is disconnected; make decision, based on the decision information, as to whether the communication information is to be deleted; and continue making the decision while the application is not running. The second memory stores basic software that causes the processor to delete the communication information when it is determined that the wireless communication is disconnected or when it is decided that the communication information is to be deleted.

16 Claims, 13 Drawing Sheets

INFORMATION PROCESSING APPARATUS AND COMPUTER PROGRAM PRODUCT

CROSS-REFERENCE TO RELATED APPLICATIONS

The present application claims priority under 35 U.S.C. §119 to Japanese Patent Application No. 2015-242378, filed on Dec. 11, 2015. The contents of which are incorporated herein by reference in their entirety.

BACKGROUND OF THE INVENTION

1. Field of the Invention

The present invention relates an information processing apparatus and a computer program product.

2. Description of the Related Art

There is conventionally known a technique that enables an information device to connect to a network through wireless communication to perform information processing. For example, Japanese Unexamined Patent Application Publication No. 2004-96495 discloses an electronic conferencing system including a conference server and a plurality of terminals, in which the terminals are connected to a network via access points through wireless communication.

In a case where, for example, application installed in a terminal for network connection establishes connection with a network through wireless communication via an access point, a profile describing settings for use by the application to connect the terminal to the network is typically installed in the terminal. When an instruction to disconnect the terminal from the network from a user or the like is accepted, the application disconnects the terminal from the network and requests basic software or the like (e.g., operating system (OS)) of the terminal to delete the profile. Consequently, the profile is deleted by the OS. An effective time that indicates a period of time during which the profile is effective, is specified in the profile. The application checks the effective time of the profile during when the terminal is connected to the network and, when the effective time has expired, the application deletes the profile and disconnects the terminal from the network.

However, in a state where the application is closed (not running), the function of managing the effective time is also undesirably stopped and, even after the effective time of the profile has expired, the profile remains without being deleted. As a result, a problem that the terminal that is to be disconnected from the network undesirably remains connected to the network. Therefore, sufficient network security cannot be ensured.

SUMMARY OF THE INVENTION

According to one aspect of the present invention, an information processing apparatus performs wireless communication with a wireless-communication mediation device that mediates connection to a network. The information processing apparatus includes a first wireless communication interface, a second wireless communication interface, a processor, a first memory, and a second memory. The first wireless communication interface performs wireless communication with the wireless-communication mediation device according to a first wireless communication method. The second wireless communication interface performs, using the communication information, wireless communication with the wireless-communication mediation device according to the second wireless communication method different from the first wireless communication method. The first memory stores an application that, when executed by the processor, causes the processor to acquire, via the wireless communication performed by the first wireless communication interface, creation information required to create the communication information used by the second wireless communication interface; create the communication information containing the acquired creation information and decision information for use in deciding whether the communication information is to be deleted; determine whether the wireless communication with the wireless-communication mediation device performed by the second wireless communication interface according to the second wireless communication method using the communication information is disconnected; make decision, based on the decision information contained in the created communication information, as to whether the communication information is to be deleted; and continue making the decision as to whether the communication information is to be deleted while the application is not running. The second memory stores a basic software that, when executed by the processor, causes the processor to delete the communication information when it is determined that the wireless communication with the wireless-communication mediation device according to the second wireless communication method using the communication information is disconnected or when it is decided that the communication information is to be deleted.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
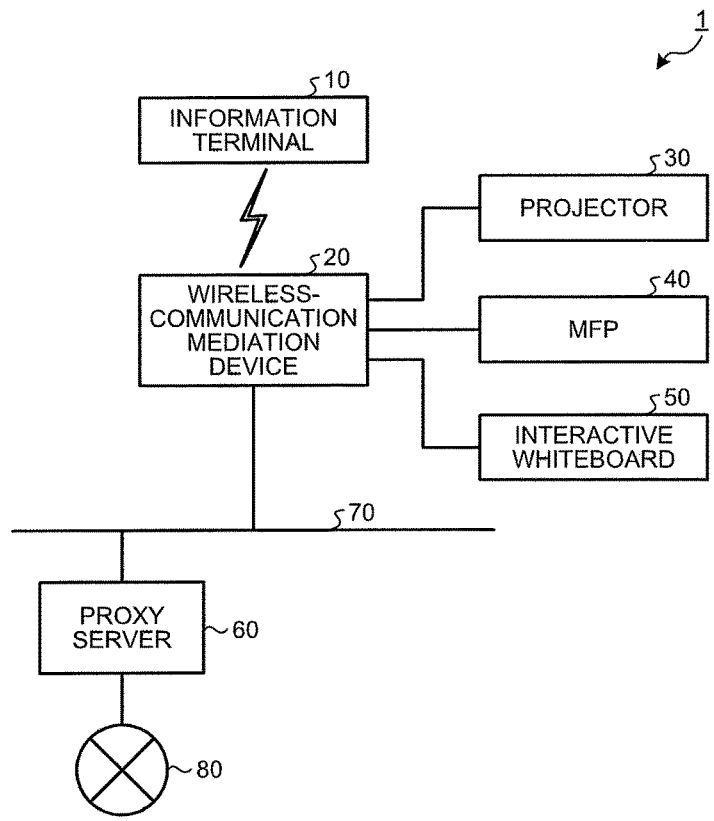
FIG. 1 is a diagram illustrating an example of a configuration of a system.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An object of an embodiment is to provide an information processing apparatus that is capable of ensuring sufficient network security.

Embodiment of the present invention will be described in detail below with reference to the drawings.

FIG. 1 is a diagram illustrating an example of a configuration of a system 1 according to an embodiment of the present invention. As illustrated in FIG. 1, the system 1 includes an information terminal 10, a wireless-communication mediation device 20, a projector 30, an MFP (Multi-Function Peripheral) 40, an interactive whiteboard 50, a proxy server 60, and the like.

Although one information terminal 10 is illustrated as an example in FIG. 1 for convenience sake, the present embodiment is not limited thereto and an arbitrary number of information terminals 10 can be included in the system 1. Furthermore, although the projector 30, the MFP 40, and the interactive whiteboard 50 are illustrated in FIG. 1 as examples of devices other than the information terminal 10 included in the system 1, the devices are not limited thereto and the types and the number of devices included in the system 1 can arbitrarily be changed.

The wireless-communication mediation device 20 is, for example, an access point and has a role in connecting the information terminal 10 that is connected wirelessly, and the projector 30, the MFP 40, and the interactive whiteboard 50 that are connected wiredly to an external network 80 such as the Internet via a wired LAN (Local Area Network) 70 and the proxy server 60. In this example, the wireless-communication mediation device 20 can connect the respective devices included in the system 1 to the network 80 using a wireless communication technique such as Bluetooth (registered trademark) or WiFi (registered trademark).

The wireless-communication mediation device 20 also has a dynamic host configuration protocol (DHCP) server function of distributing an Internet Protocol (IP) address for identifying a device on the network 80 to a device (such as the information terminal 10) connected wirelessly or wiredly. The wireless-communication mediation device 20 also can set permission/non-permission of accesses from an existing network (such as the wired LAN 70 or the network 80) to devices (such as the information terminal 10) connected to the wireless-communication mediation device 20, or permission/non-permission of accesses from devices connected to the wireless-communication mediation device 20 to an existing network individually with respect to each device according to an access control rule previously defined by an operation of a user (administrator) or the like. The access control rule can be fixed or can be variably set by an operation of a user (administrator) or the like.

The information terminal 10 as an example of "information processing apparatus" is described next. The information terminal 10 according to the present embodiment includes a portable multifunctional device (smart device) such as a smartphone or a tablet.

Figure 2:
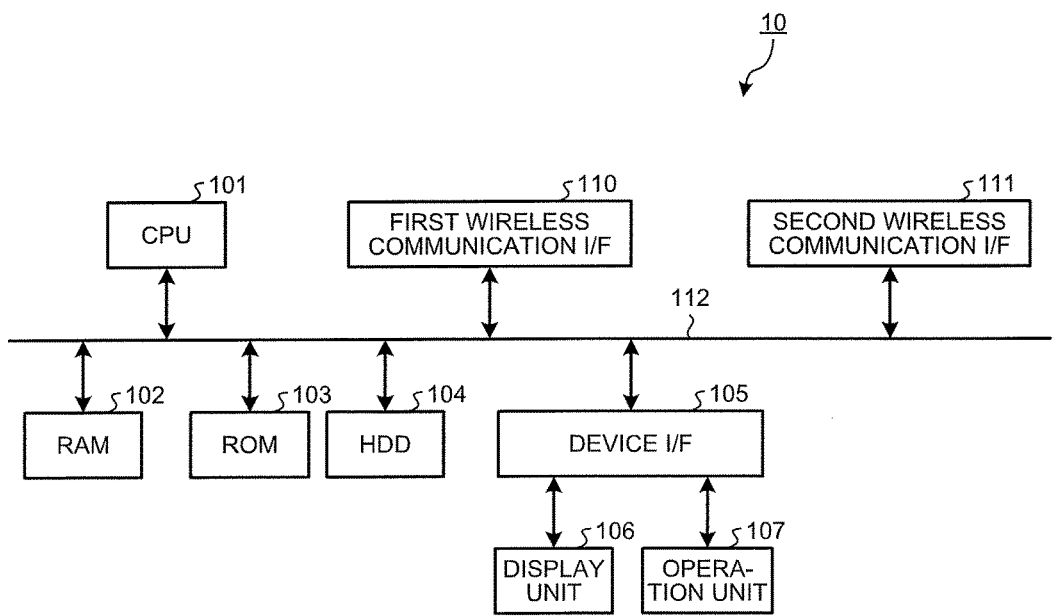
FIG. 2 is a diagram illustrating an example of a hardware configuration of an information terminal.

FIG. 2 is a diagram illustrating an example of a hardware configuration of the information terminal 10. As illustrated in FIG. 2, the information terminal 10 includes a central processing unit (CPU) 101, a random access memory (RAM) 102, a read only memory (ROM) 103, a hard disk drive (HDD) 104, a device interface (I/F) 105, a first wireless communication I/F 110, and a second wireless communication I/F 111, which are connected to each other with a bus 112. A display unit 106 and an operation unit 107 are connected to the device I/F 105.

The CPU 101 is a computing unit and generally controls an entire operation of the information terminal 10. The RAM 102 is a volatile storage medium from/to which information can be read/written rapidly, and is used as a work area when the CPU 101 processes information. The ROM 103 is a read-only non-volatile storage medium and has programs such as firmware stored therein. The HDD 104 is a non-volatile storage medium from/to which information can be read/written, and has an OS and various control programs and applications stored therein.

In this example, the OS is basic software for providing a basic function of controlling hardware included in the information terminal 10. An application is software for operating hardware resources included in the information terminal 10 to provide predetermined functions. In the present embodiment, an application (hereinafter, may be referred to as "wireless connection application") for enabling an easy connection to the network 80 via the wireless-communication mediation device 20 is installed in advance as well as the OS described above in the information terminal 10. The wireless connection application is an example of "program". The OS installed in the information terminal 10 of the present embodiment is, for example, Android (registered trademark).

The device I/F 105 is an interface for connecting the display unit 106 and the operation unit 107 to the bus 112. The display unit 106 is a visual user interface for displaying various types of information and is constituted of, for example, an liquid crystal display (LCD). The operation unit 107 is a user interface for enabling a user to input various types of information to the information terminal 10, such as a keyboard or a mouse.

The first wireless communication I/F 110 is an interface for enabling wireless communication according to a first wireless communication method to perform wireless communication with the wireless-communication mediation device 20 with a first wireless communication distance. While being an interface for enabling wireless communication using a function of Bluetooth (registered trademark) in this example, the first wireless communication I/F 110 is not limited thereto. The second wireless communication I/F 111 is an interface for enabling second wireless communication to wirelessly communicate with the wireless-communication mediation device 20 with a second wireless communication distance longer than the first wireless communication distance. While being an interface for enabling wireless communication using a function of WiFi (registered trademark) in this example, the second wireless communication I/F 111 is not limited thereto.

Figure 3:
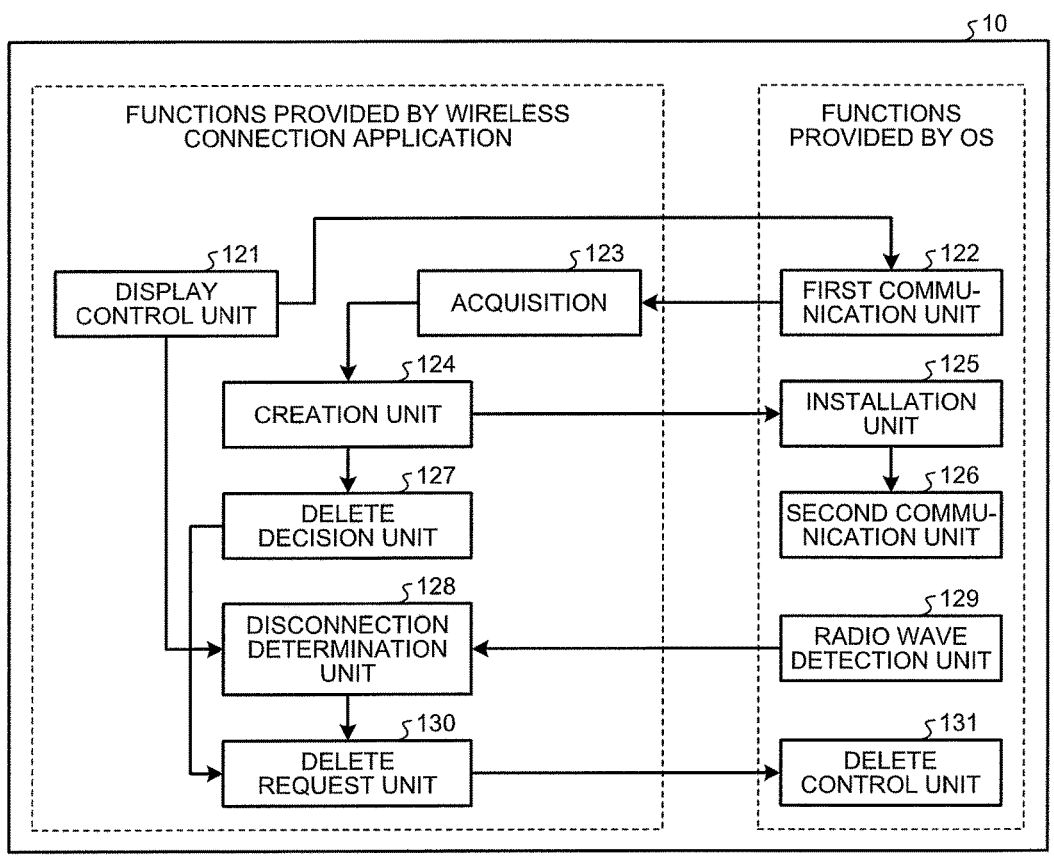
FIG. 3 is a diagram illustrating an example of functions provided by the information terminal.

FIG. 3 is a diagram illustrating an example of functions provided by the information terminal 10. As illustrated in FIG. 3, the information terminal 10 includes a display control unit 121, a first communication unit 122, an acquisition unit 123, a creation unit 124, an installation unit 125, a second communication unit 126, a delete decision unit 127, a disconnection determination unit 128, a radio wave detection unit 129, a delete request unit 130, and a delete control unit 131. While the functions related to the present embodiment are mainly illustrated in FIG. 3 for convenience sake, functions included in the information terminal 10 are not limited thereto. In this example, the first communication unit 122 performs wireless communication with the wireless-communication mediation device 20 according to the first wireless communication method described above. As described above, the wireless communication with the wireless-communication mediation device 20 according to the first wireless communication method is wireless communication using the function of Bluetooth (registered trademark). The second communication unit 126 performs wireless communication with the wireless-communication mediation device 20 according to the second wireless communication method described above. As described above, the wireless communication with the wireless-communication mediation device 20 according to the second wireless communication method is wireless communication using the function of WiFi (registered trademark).

In the example of FIG. 3, functions of the display control unit 121, the acquisition unit 123, the creation unit 124, the delete decision unit 127, the disconnection determination unit 128, and the delete request unit 130 are provided by the wireless connection application. More specifically, the respective functions of the display control unit 121, the acquisition unit 123, the creation unit 124, the delete decision unit 127, the disconnection determination unit 128, and the delete request unit 130 are implemented by execution of the wireless connection application by the CPU 101.

Respective functions of the first communication unit 122, the installation unit 125, the second communication unit 126, the radio wave detection unit 129, and the delete control unit 131 are provided by the OS. More specifically, the functions of the first communication unit 122, the installation unit 125, the second communication unit 126, the radio wave detection unit 129, and the delete control unit 131 are implemented by execution of the OS by the CPU 101.

Figure 4:
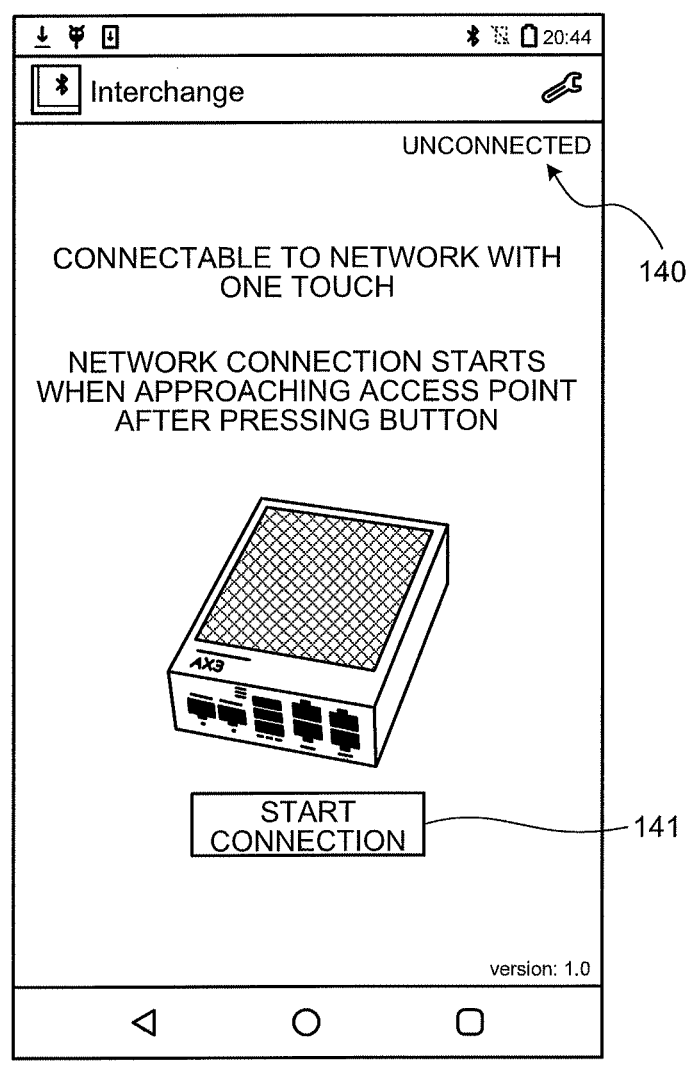
FIG. 4 is a diagram illustrating an example of an initial screen.
Figure 5:
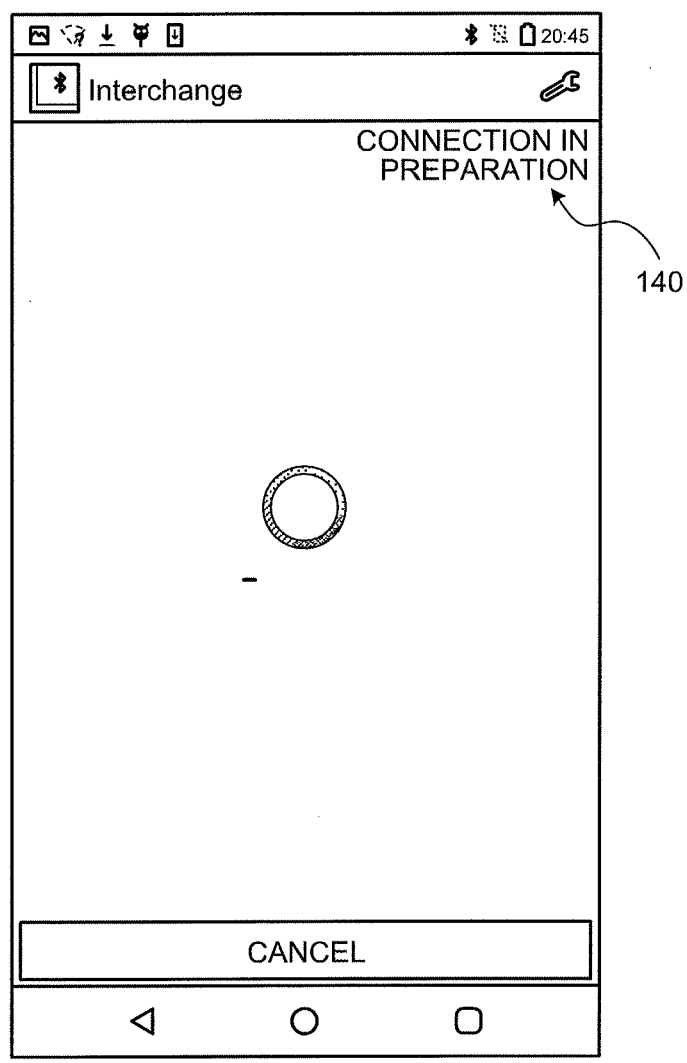
FIG. 5 is a diagram illustrating an example of a connection preparation screen.

The display control unit 121 executes control to display various screens on the display unit 106 and also receives operations of a user via the screens. In this example, an icon corresponding to the wireless connection application (an example of a display component (user interface (UI) component) for invoking functions of the wireless connection application) is placed on a home screen displayed on the display unit 106. The wireless connection application starts when an operation of pressing the icon is received. The display control unit 121 executes, for example, control to display an initial screen of the wireless connection application as illustrated in FIG. 4 on the display unit 106 at the time of start of the wireless connection application. At least connection status information 140 indicating that the device is unconnected to the network 80 and a button 141 for instructing a user to start connection to the network 80 are displayed on the initial screen. When receiving pressing of the button 141 on the initial screen, the display control unit 121 executes control to display a connection preparation screen indicating that connection to the network 80 is in preparation as illustrated in FIG. 5 on the display unit 106. In the example illustrated in FIG. 5, the connection status information 140 indicating that connection to the network 80 is in preparation is displayed on the connection preparation screen. The display control unit 121 notifies the first communication unit 122 described later of information (first operation information) indicating that pressing of the button 141 on the initial screen has been received.

The descriptions are continued with reference to FIG. 3. In this example, the first communication unit 122 starts the operation with reception of a notification of the first operation information described above from the display control unit 121 as a trigger and starts a process of detecting (receiving) a signal from the wireless-communication mediation device 20 to perform wireless communication with the wireless-communication mediation device 20 according to the first wireless communication method. Furthermore, in this example, the wireless-communication mediation device 20 periodically issues a paring request (an example of the signal for performing wireless communication with the wireless-communication mediation device 20 according to the first wireless communication method) to request mutual authentication (paring) with the other party terminal (the information terminal 10 in this example) present in a predetermined range (within a 10-cm radius in this example) around the wireless-communication mediation device 20. The first communication unit 122 having received the paring request performs a negotiation according to a procedure (protocol) of Bluetooth (registered trademark) with the wireless-communication mediation device 20 and establishes a communication line for performing wireless communication with the wireless-communication mediation device 20 according to the first wireless communication method. In this way, the information terminal 10 can perform wireless communication with the wireless-communication mediation device 20 according to the first wireless communication method.

The acquisition unit 123 acquires creation information necessary for creating communication information (also "profile" in following descriptions) to perform wireless communication according to the second wireless communication method described above via the wireless communication by the first communication unit 122. In this example, the wireless-communication mediation device 20 transmits the creation information to the information terminal 10 being the other party of the wireless communication according to the first wireless communication method. Therefore, the first communication unit 122 having established the communication line for performing wireless communication with the wireless-communication mediation device 20 according to the first wireless communication method can receive the creation information from the wireless-communication mediation device 20 and can transfer the received creation information to the acquisition unit 123. In this way, the acquisition unit 123 can acquire the creation information. In this example, the creation information includes at least an SSID (Service Set IDentifier) identifying the network 80 and a password indicating an encryption key.

The creation unit 124 creates communication information containing the creation information acquired by the acquisition unit 123 and decision information for use in deciding whether profile (the communication information) is to be deleted. In this example, the decision information contained in the profile is effective time indicating a period of time during which the profile is effective, and a profile contains at least the effective time indicating the period of time during which the profile is effective, the SSID, and the password. More specifically, the profile contains the effective time (the decision information), the SSID, the password, and a type of encryption scheme. In this example, the creation unit 124 determines the effective time in accordance with initial settings. For example, the initial setting can be a setting to set the effective time to "three hours". The initial setting can arbitrarily be changed by an operation of a user or the like. After creating a profile, the creation unit 124 requests the installation unit 125 to install the created profile. The creation unit 124 sends information notifying the profile's effective time to the delete decision unit 127, which will be described later. Alternatively, the creation unit 124 may send notification that the creation unit 124 has created the profile to the delete decision unit 127 and, upon receiving the notification, the delete decision unit 127 may acquire information of the profile's effective time.

In this example, upon receiving the request from the creation unit 124, the installation unit 125 performs control to install the profile created by the creation unit 124. The second communication unit 126 performs wireless communication with the wireless-communication mediation device 20 according to the second wireless communication method described above using the profile installed by the installation unit 125 (in other words, the profile created by the creation unit 124).

Figure 6:
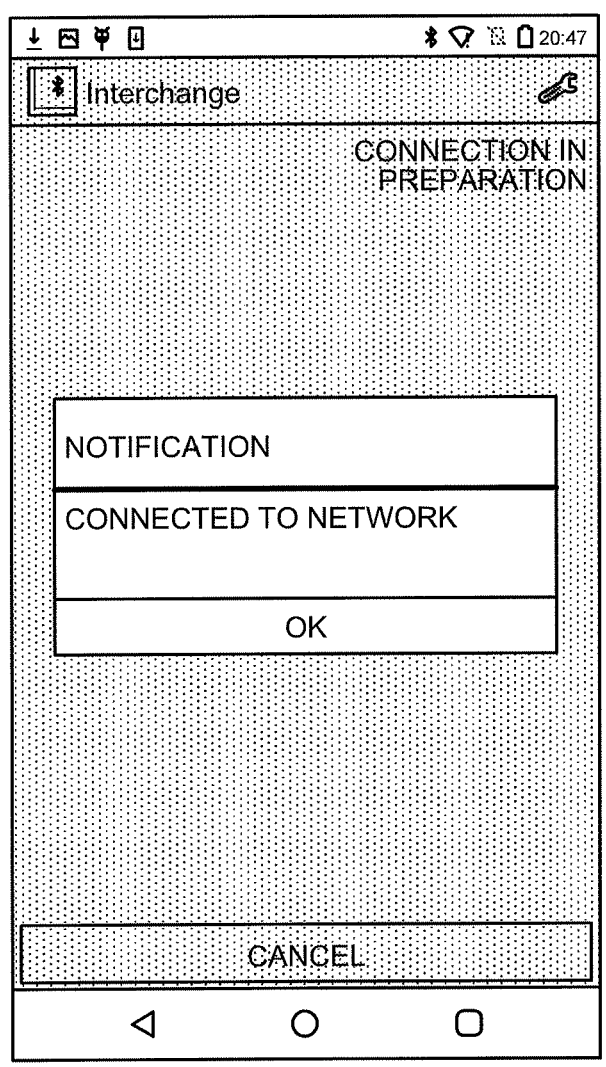
FIG. 6 is a diagram illustrating an example of a connection success screen.
Figure 7:
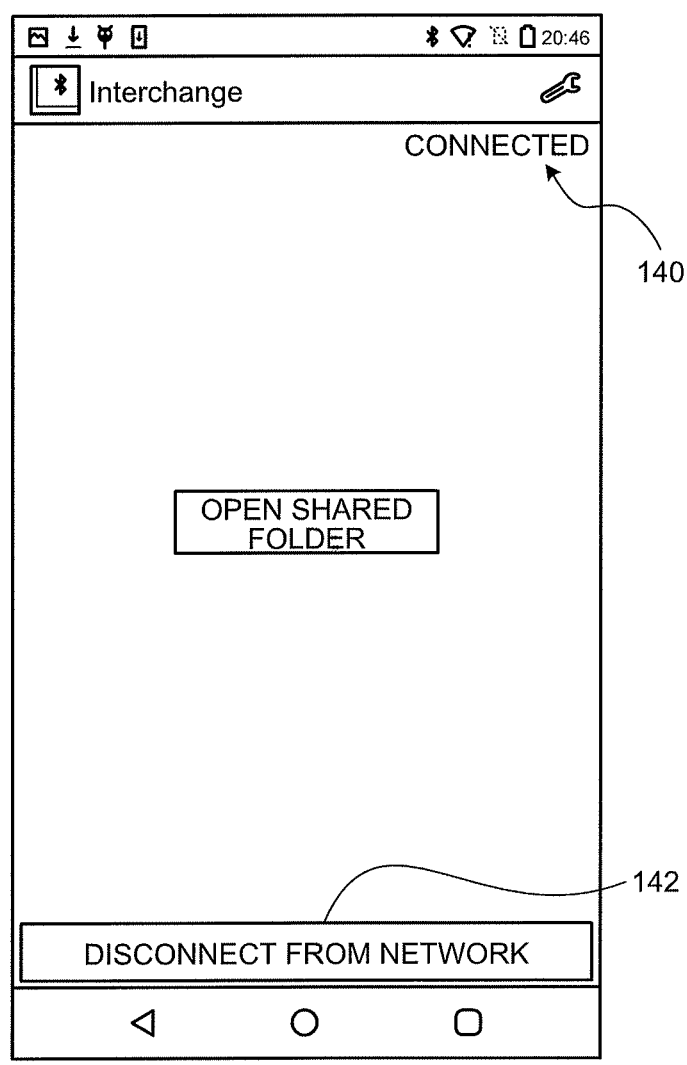
FIG. 7 is a diagram illustrating an example of a connected screen.

In the present embodiment, when connection to the network 80 via the wireless-communication mediation device 20 is successfully performed (when a communication line for performing wireless communication according to the second wireless communication method is established by the second communication unit 126), the display control unit 121 can execute control to display a connection success screen indicating a screen for notifying of a success of the connection to the network 80 as illustrated in FIG. 6 on the display unit 106. Upon reception of pressing of an "OK" button on the connection success screen, the display control unit 121 also can execute control to display a connected screen indicating a screen after the success of the connection to the network 80, for example, as illustrated in FIG. 7 on the display unit 106, or can execute control to display a browser screen (Web page) corresponding to a Uniform Resource Locator (URL) designated in advance in an initial setting on the display unit 106. In this example, the explanation is given about an example in a case where the connected screen illustrated in FIG. 7 is displayed on the display unit 106e. In the example of FIG. 7, the connection status information 140 indicating that the connection to the network 80 is completed is displayed on the connected screen. A button 142 for instructing to disconnect from the network 80 (disconnect the wireless communication according to the second wireless communication method) is also displayed on the connected screen.

Figure 8:
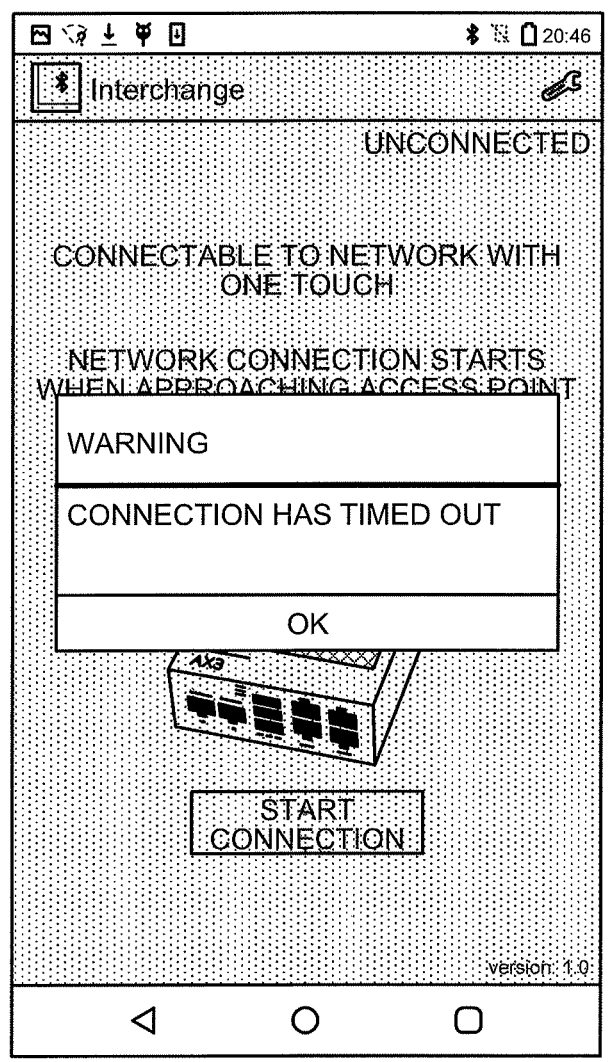
FIG. 8 is a diagram illustrating an example of a first error screen.
Figure 9:
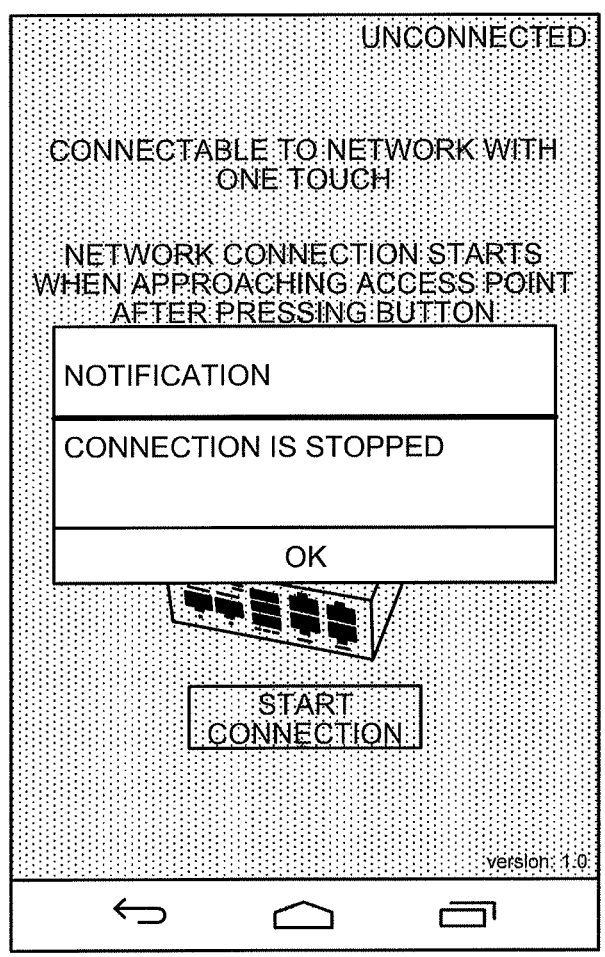
FIG. 9 is a diagram illustrating an example of a second error screen.

In this example, the display control unit 121 executes control to display a first error screen indicating a connection failure due to time-out as illustrated in FIG. 8 on the display unit 106 when connection to the network 80 is not successfully performed after a certain time (30 seconds, for example) has elapsed from reception of pressing of the button 141 on the initial screen illustrated in FIG. 4. Furthermore, in this example, when pressing of a "CANCEL" button on the connection preparation screen illustrated in FIG. 5 is received, the display control unit 121 notifies the first communication unit 122 and the second communication unit 126 of second operation information indicating reception of pressing of the "CANCEL" button on the connection preparation screen, and also executes control to display a second error screen indicating that the connection is canceled as illustrated in FIG. 9 on the display unit 106. The first communication unit 122 and the second communication unit 126 having received the notification of the second operation information described above stop respective connection processes, and the first communication unit 122 transitions to a standby state again. When pressing of an "OK" button displayed on the first error screen or the second error screen is received, the display control unit 121 executes control to display the initial screen illustrated in FIG. 4 again on the display unit 106.

Referring back to FIG. 3, the descriptions are continued. The delete decision unit 127 is a unit that decides whether the profile created by the creation unit 124 is to be deleted based on the decision information (in this example, the effective time) contained in the profile. The delete decision unit 127 continues making the decision as to whether the profile is to be deleted while the application (in this example, the wireless connection application) for providing at least the functions of the acquisition unit 123, the creation unit 124, the disconnection determination unit 128, and the delete decision unit 127 is not running. The disconnection determination unit 128 and the delete decision unit 127 will be described later. In short, the delete decision unit 127 is configured to continue operating even in the state where the wireless connection application is not running. In this example, in the state where the wireless connection application is not running, at least the display control unit 121, the acquisition unit 123, and the creation unit 124 stop operating. Note that, as a matter of course, in a state where the wireless connection application is running, the functions provided by the wireless connection application can operate.

The delete decision unit 127 decides that the profile is to be deleted when the effective time has expired. In this case, the delete decision unit 127 requests the delete request unit 130, which will be described later, to delete the profile. The delete decision unit 127 may start measuring time for the effective time triggered by receipt of notification of the effective time (i.e., notification that the creation unit 124 has created a profile) from the creation unit 124 or, alternatively, may start measuring time for the effective time triggered by receipt of notification that connection with the network 80 is successfully established from the second communication unit 126.

Figure 10:
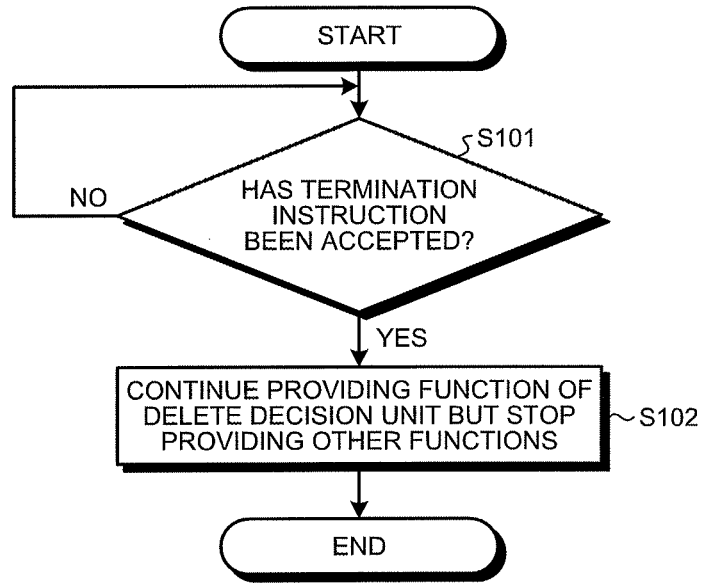
FIG. 10 is a flowchart illustrating an example operation of a wireless connection application.
Figure 11:
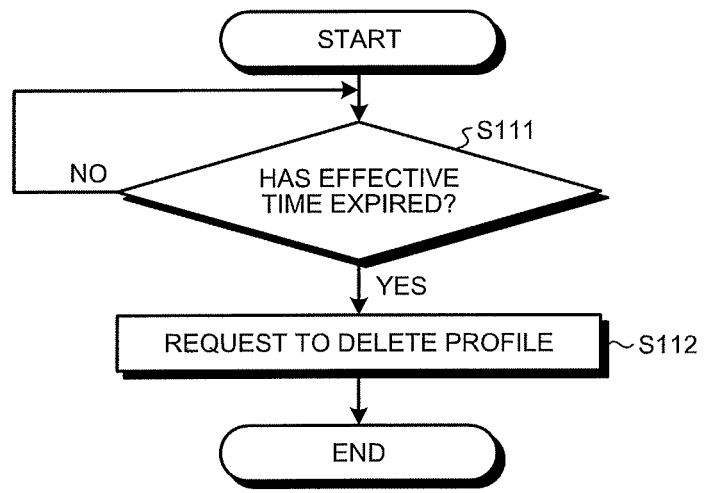
FIG. 11 is a flowchart illustrating an example operation of a delete decision unit.

FIG. 10 is a flowchart illustrating an example operation of the wireless connection application to be performed upon accepting an instruction (termination instruction) that instructs to terminate the wireless connection application. As illustrated in FIG. 10, when the wireless connection application accepts a termination instruction (Yes at step S101), the wireless connection application continues providing the function of the delete decision unit 127 but stops providing the other functions (step S102). FIG. 11 is a flowchart illustrating an example operation of the delete decision unit 127. As illustrated in FIG. 11, when the effective time has expired (Yes at step S111), the delete decision unit 127 requests the delete request unit 130 to delete the profile (step S112).

Figure 12:
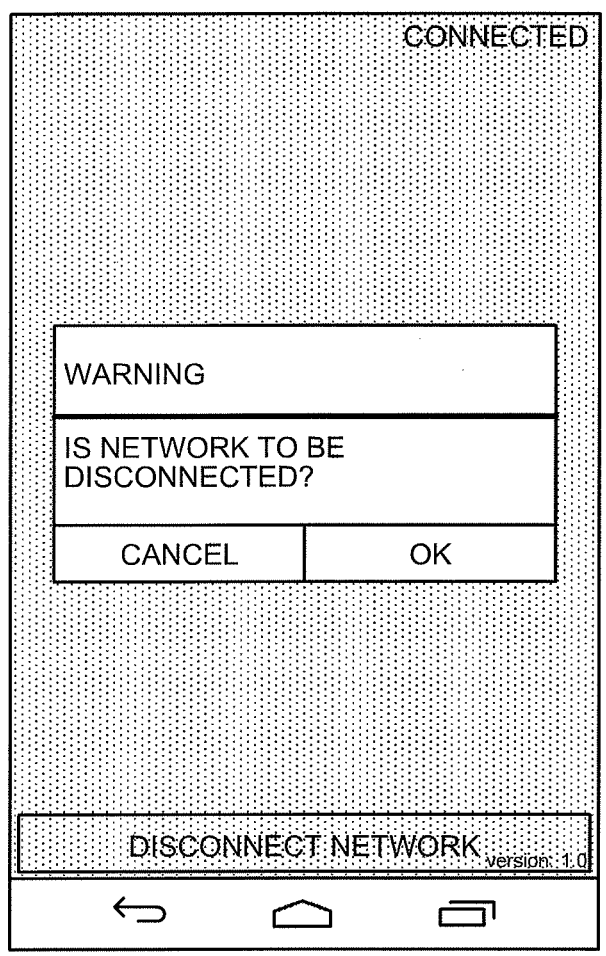
FIG. 12 is a conceptual diagram illustrating an example of a disconnection confirmation screen.
Figure 13:
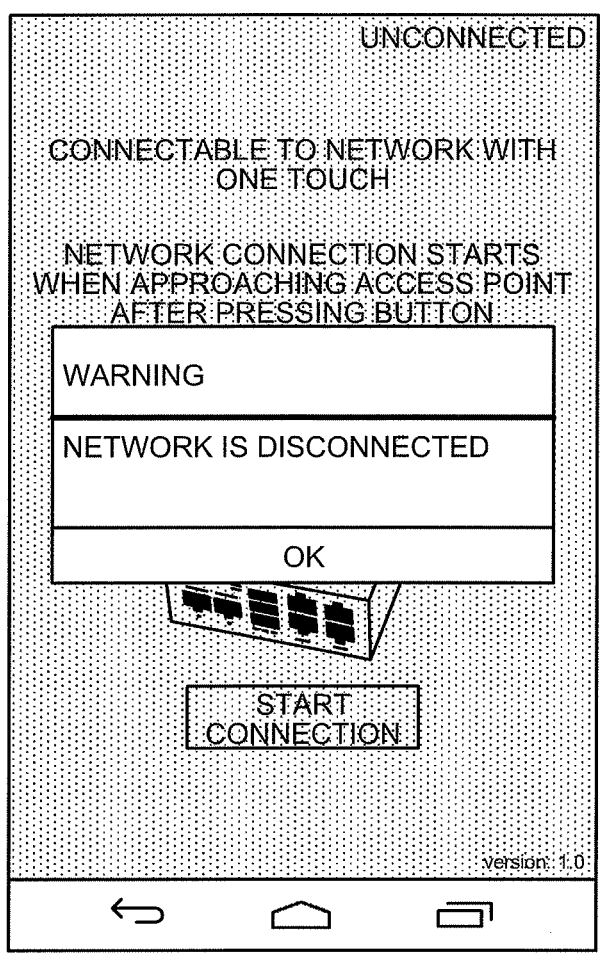
FIG. 13 is a conceptual diagram illustrating an example of a disconnection informing screen.

Referring back to FIG. 3, the descriptions are continued. The disconnection determination unit 128 determines whether the wireless communication with the wireless-communication mediation device 20 according to the second wireless communication method is disconnected. When the wireless communication with the wireless-communication mediation device 20 according to the second wireless communication method is disconnected, the disconnection determination unit 128 requests the delete request unit 130 to delete the profile. In the present embodiment, the disconnection determination unit 128 requests the delete request unit 130 to delete the profile when an instruction to disconnect the wireless communication with the wireless-communication mediation device 20 according to the second wireless communication method is received. In this example, when pressing of the button 142 displayed on the connected screen described above is received, the display control unit 121 performs control to display a disconnection confirmation screen indicating a screen for confirming that the connection to the network 80 is to be disconnected as illustrated in FIG. 12. When receiving pressing of an "OK" button displayed on the disconnection confirmation screen, the disconnection determination unit 128 requests the delete request unit 130 to delete the profile. The display control unit 121 performs control to display a disconnection informing screen indicating a screen for informing if disconnection from the network 80 as illustrated in FIG. 13 on the display unit 106. When receiving pressing of an "OK" button displayed on the disconnection informing screen, the display control unit 121 performs control to display again the initial screen illustrated in FIG. 4 on the display unit 106.

In the present embodiment, the disconnection determination unit 128 determines that the wireless communication with the wireless-communication mediation device 20 according to the second wireless communication method has been disconnected based on the intensity of radio waves received from the wireless-communication mediation device 20. More specifically, the disconnection determination unit 128 periodically receives a detection result of radio waves from the radio-wave detection unit 129 that detects the intensity of radio waves received from the wireless-communication mediation device 20, and can determine that the wireless communication with the wireless-communication mediation device 20 according to the second wireless communication method has been disconnected when the intensity of radio waves is equal to or lower than a threshold value. When it is determined that the wireless communication with the wireless-communication mediation device 20 according to the second wireless communication method has been disconnected, the disconnection determination unit 128 requests the delete request unit 130 to delete the profile.

When the disconnection determination unit 128 determines that the wireless communication with the wireless-communication mediation device 20 according to the second wireless communication method has been disconnected, or when the delete decision unit 127 decides that the profile is to be deleted, the delete request unit 130 requests the OS (in this example, the delete control unit 131), which is an example of the basic software, to delete the profile. More specifically, the delete request unit 130 transmits a delete request, in which an SSID is designated, that requests deletion of a profile corresponding to the designated SSID to the delete control unit 131. Upon receiving this request, the delete control unit 131 selects, from among installed profiles, a profile containing the SSID coincident with the SSID contained in the delete request received from the delete request unit 130. The delete control unit 131 performs control to delete the selected profile. In this example, "delete unit" can be considered to correspond to the function of the delete control unit 131 or correspond to a combination of the function of the delete request unit 130 and the function of the delete control unit 131.

The delete request unit 130, needless to say, can operate during when the wireless connection application is running, but may be configured to continue operating even in the state where the wireless connection application is not running. Alternatively, for example, the delete request unit 130 may be configured such that, in the state where the wireless connection application is not running, the delete request unit 130 stops operating but starts operating (even in the state where the wireless connection application is not running) triggered by receipt of a request (request to delete a profile) from the delete decision unit 127.

Figure 14:
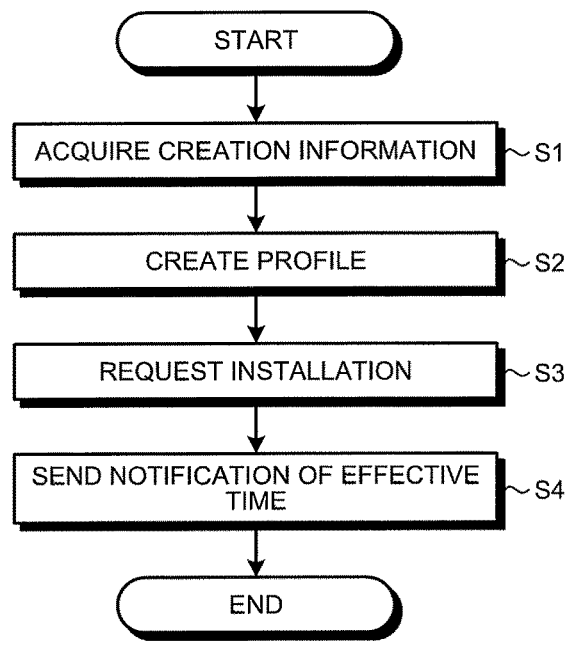
FIG. 14 is a flowchart illustrating an example of a process performed by the wireless connection application to create a profile.

FIG. 14 is a flowchart illustrating an example of a process performed by the wireless connection application to create a profile. As illustrated in FIG. 13, the acquisition unit 123 acquires the creation information described above from the first communication unit 122 first (step S1). Subsequently, the creation unit 124 determines effective time in accordance with the initial settings and creates a profile that contains the determined effective time and the creation information acquired at step S1 (step S2). Next, the creation unit 124 requests the installation unit 125 (which is a function provided by the OS) to install the profile created at step S2 (step S3), and sends notification of the effective time of the profile created at step S2 to the delete decision unit 127 (step S4). Processing from step S1 to step S4 is performed as specifically described above.

Figure 15:
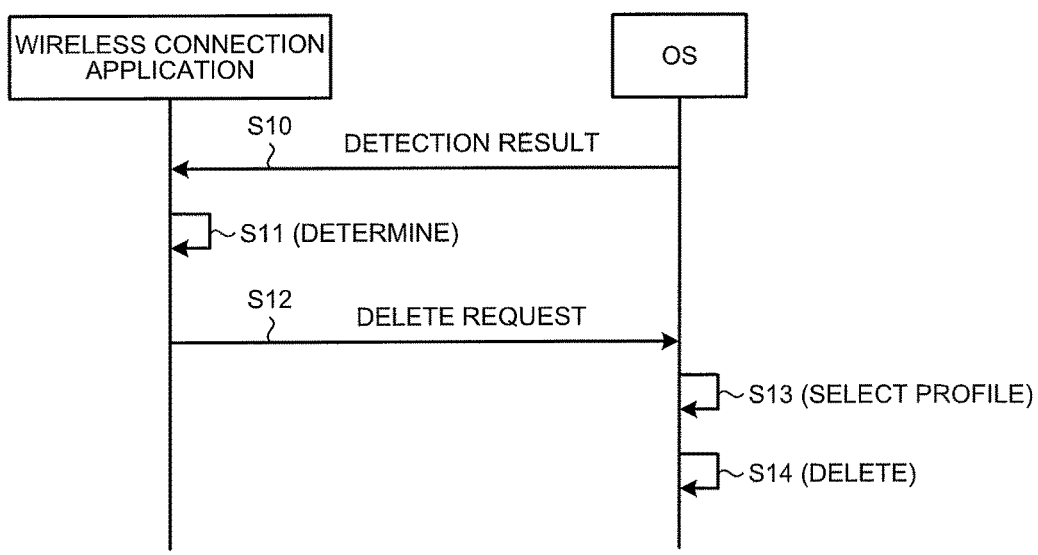
FIG. 15 is a sequence diagram illustrating an example of an operation procedure performed by the information terminal.

FIG. 15 is a sequence diagram illustrating an example of an operation procedure for the information terminal 10 according to the present embodiment. As described above, the OS (the radio wave detection unit 129) periodically notifies the wireless connection application of a detection result of the intensity of radio waves received from the wireless-communication mediation device 20 (step S10). The wireless connection application (the disconnection determination unit 128) determines whether the wireless communication with the wireless-communication mediation device 20 according to the second wireless communication method has been disconnected based on a detection result notified from the OS (step S11). The following description is given about an example in a case where it is determined that the wireless communication with the wireless-communication mediation device 20 according to the second wireless communication method has been disconnected. Subsequently, the wireless connection application (the delete request unit 130) transmits the delete request described above to the OS (the delete control unit 131) (step S12).

Upon receiving the delete request from the wireless connection application, the OS (the delete control unit 131) selects, from among installed profiles, a profile containing an SSID coincident with an SSID contained in the received delete request (step S13). Next, the OS deletes the profile selected at step S13 (step S14).

When the wireless communication with the wireless-communication mediation device 20 according to the second wireless communication method is disconnected at the time of start of the wireless connection application described above and also when a profiles is present (remains), the delete request unit 130 according to the present embodiment requests the delete control unit 131 to delete the profile.

Figure 16:
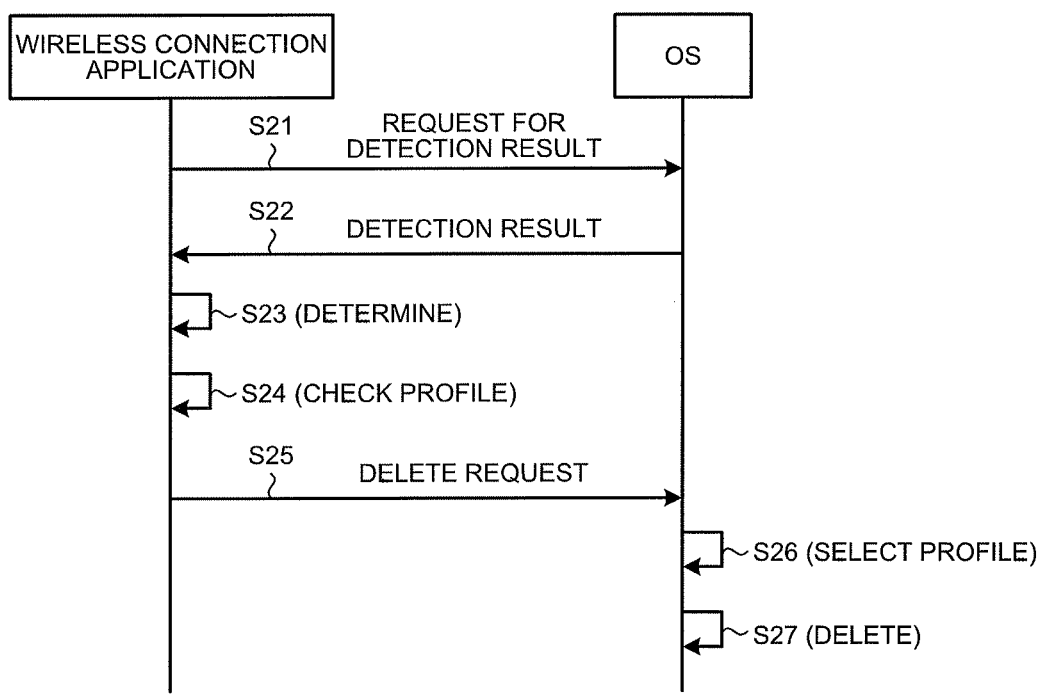
FIG. 16 is a sequence diagram illustrating an example of an operation procedure performed by the information terminal.

FIG. 16 is a sequence diagram illustrating an example of an operation procedure performed by the wireless connection application at the time of start. The started wireless connection application (the disconnection determination unit 128) demands the OS for a detection result of the intensity of radio waves received from the wireless-communication mediation device 20 (step S21). In response thereto, the wireless connection application receives the detection result from the OS (step S22). Next, the wireless connection application determines whether wireless communication with the wireless-communication mediation device 20 according to the second wireless communication method has been disconnected based on the detection result received at step 22 (step S23). The following description is given about an example in a case where it is determined that the wireless communication with the wireless-communication mediation device 20 according to the second wireless communication method has been disconnected.

Subsequently, the wireless connection application checks whether a profiles is present (remains) (step S24). In this example, the description is given about an example in a case where a profile is present (a case where a profile remains). Next, the wireless connection application transmits the delete request described above to the OS (step S25).

Upon receiving the delete request from the wireless connection application, the OS selects, from among the installed profiles, a profile containing an SSID coincident with the SSID contained in the received delete request (step S26). Next, the OS deletes the profile selected at S26 (S27).

As described above, according to the present embodiment, even in the state where the wireless connection application for providing at least the functions of the acquisition unit 123, the creation unit 124, the delete decision unit 127, and the disconnection determination unit 128 is not running, decision as to whether a profile is to be deleted continues to be made. When the delete decision unit 127 decides that the profile is to be deleted, the delete request unit 130 requests the delete control unit 131 to delete the profile. Upon receiving this request, the delete control unit 131 deletes the profile. Thus, according to the present embodiment, even in the state where the wireless connection application is not running (i.e., closed), decision (which is to be made based on effective time in this example) as to whether a profile is to be deleted continues to be made. Accordingly, an undesirable situation that the information terminal 10 that is to be disconnected from the network 80 remains to be connected to the network 80 can be prevented. As a result, sufficient network security can be ensured.

The programs executed by the system 1 (such as the information terminal 10) according to the embodiment described above can be configured as a file of an installable format or an executable format, to be provided by storing it on a computer readable storage medium including a CD-ROM, a flexible disk (FD), a CD-R, a digital versatile disk (DVD), a universal serial bus (USB), and the like, or can be configured to be provided or distributed via a network such as the Internet. In addition, the respective programs can be configured to be provided by being incorporated in a ROM or the like.

According to the present invention, sufficient network security can be ensured.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus that performs wireless communication with a wireless-communication mediation device that mediates connection to a network, the information processing apparatus comprising:
    a first wireless communication interface configured to perform wireless communication with the wireless-communication mediation device according to a first wireless communication method;
    a second wireless communication interface configured to perform, using communication information, wireless communication with the wireless-communication mediation device according to the second wireless communication method different from the first wireless communication method; and
    a processor; and
    a first non-transitory storage medium storing an application that, when executed by the processor, causes the processor to
        acquire, via the wireless communication performed by the first wireless communication interface, creation information required to create the communication information used by the second wireless communication interface to communicate with the wireless-communication mediation device according to the second wireless communication method,
        create the communication information containing the acquired creation information and decision information for use in deciding whether the communication information is to be deleted,
        determine whether the wireless communication with the wireless-communication mediation device performed by the second wireless communication interface according to the second wireless communication method using the communication information is disconnected,
        make a decision, based on the decision information contained in the created communication information, as to whether the communication information is to be deleted, and
        continue making the decision as to whether the communication information is to be deleted while the application is not running; and a second non-transitory storage medium storing a basic software that, when executed by the processor, causes the processor to delete the communication information at the earlier of (i) the determination by the processor that the wireless communication with the wireless-communication mediation device according to the second wireless communication method using the communication information is disconnected and (ii) the decision by the processor that the communication information is to be deleted.

2. The information processing apparatus according to claim 1, wherein
the decision information is effective time indicating a period of time during which the communication information is effective, and
at the making of the decision as to whether the communication information is to be deleted, the application causes the processor to decide that the communication information is to be deleted when the effective time has expired.

3. The information processing apparatus according to claim 1, wherein the application that further causes the processor to
request the basic software to delete the communication information when it is determined that the wireless communication with the wireless-communication mediation device according to the second wireless communication method using the communication information is disconnected or when it is decided that the communication information is to be deleted, wherein
at the determination as to whether the wireless communication is disconnected, the application causes the processor to issue a request that requests deletion of the communication information when an instruction to disconnect the wireless communication with the wireless-communication mediation device according to the second wireless communication method is accepted.

4. The information processing apparatus according to claim 1, wherein, at the determination as to whether the wireless communication is disconnected, the application causes the processor to determine that the wireless communication with the wireless-communication mediation device according to the second wireless communication method has been disconnected based on an intensity of radio waves received from the wireless-communication mediation device.

5. The information processing apparatus according to claim 1, wherein the creation information contains at least an SSID identifying the network, and a password representing an encryption key.

6. The information processing apparatus according to claim 5, wherein the communication information contains the decision information, the SSID, the password, and a type of encryption scheme.

7. The information processing apparatus according to claim 1, wherein, at the creation of the communication information, the application causes the processor to determine the decision information in accordance with initial settings.

8. The information processing apparatus according to claim 1, wherein when an instruction to terminate the application is received from a user, the application stops running and providing all functions, except that the application continues to make the decision as to whether the communication information is to be deleted while the application is not running.

9. A computer program product comprising a non-transitory computer-readable recording medium storing a computer program that, when executed by a computer, causes the computer to:
acquire, via wireless communication according to a first wireless communication method, creation information required to create communication information for use in wireless communication with a wireless-communication mediation device that mediates connection to a network according to a second wireless communication method different from the first communication method;
create the communication information containing the acquired creation information and decision information for use in deciding whether the communication information is to be deleted;
determine whether the wireless communication with the wireless-communication mediation device according to the second wireless communication method using the created communication information is disconnected;
make a decision, based on the decision information contained in the created communication information, as to whether the communication information is to be deleted;
continue making the decision as to whether the communication information is to be deleted while the computer program is not running; and
request basic software of the computer to delete the communication information at the earlier of (i) the determination by the computer that the wireless communication with the wireless-communication mediation device according to the second wireless communication method using the communication information is disconnected and (ii) the decision by the computer that the communication information is to be deleted.

10. The computer program product according to claim 9, wherein
the decision information is effective time indicating a period of time during which the communication information is effective, and
at the making of the decision as to whether the communication information is to be deleted, the computer program causes the computer to decide that the communication information is to be deleted when the effective time has expired.

11. The computer program product according to claim 9, wherein, at the determination as to whether the wireless communication is disconnected, the computer program causes the computer to issue a request that requests deletion of the communication information when an instruction to disconnect the wireless communication with the wireless-communication mediation device according to the second wireless communication method is accepted.

12. The computer program product according to claim 9, wherein, at the determination as to whether the wireless communication is disconnected, the computer program causes the computer to determine that the wireless communication with the wireless-communication mediation device according to the second wireless communication method has been disconnected based on an intensity of radio waves received from the wireless-communication mediation device.

13. The computer program product according to claim 9, wherein the creation information contains at least an SSID identifying the network, and a password representing an encryption key.

14. The computer program product according to claim 13, wherein the communication information contains the decision information, the SSID, the password, and a type of encryption scheme.

15. The computer program product according to claim 9, wherein, at the creation of the communication information, the computer program causes the computer to determine the decision information in accordance with initial settings.

16. The computer program product according to claim 9, wherein the basic software is Android.

\* \* \* \* \*